No. 774,347.                                    Patented November 8, 1904.

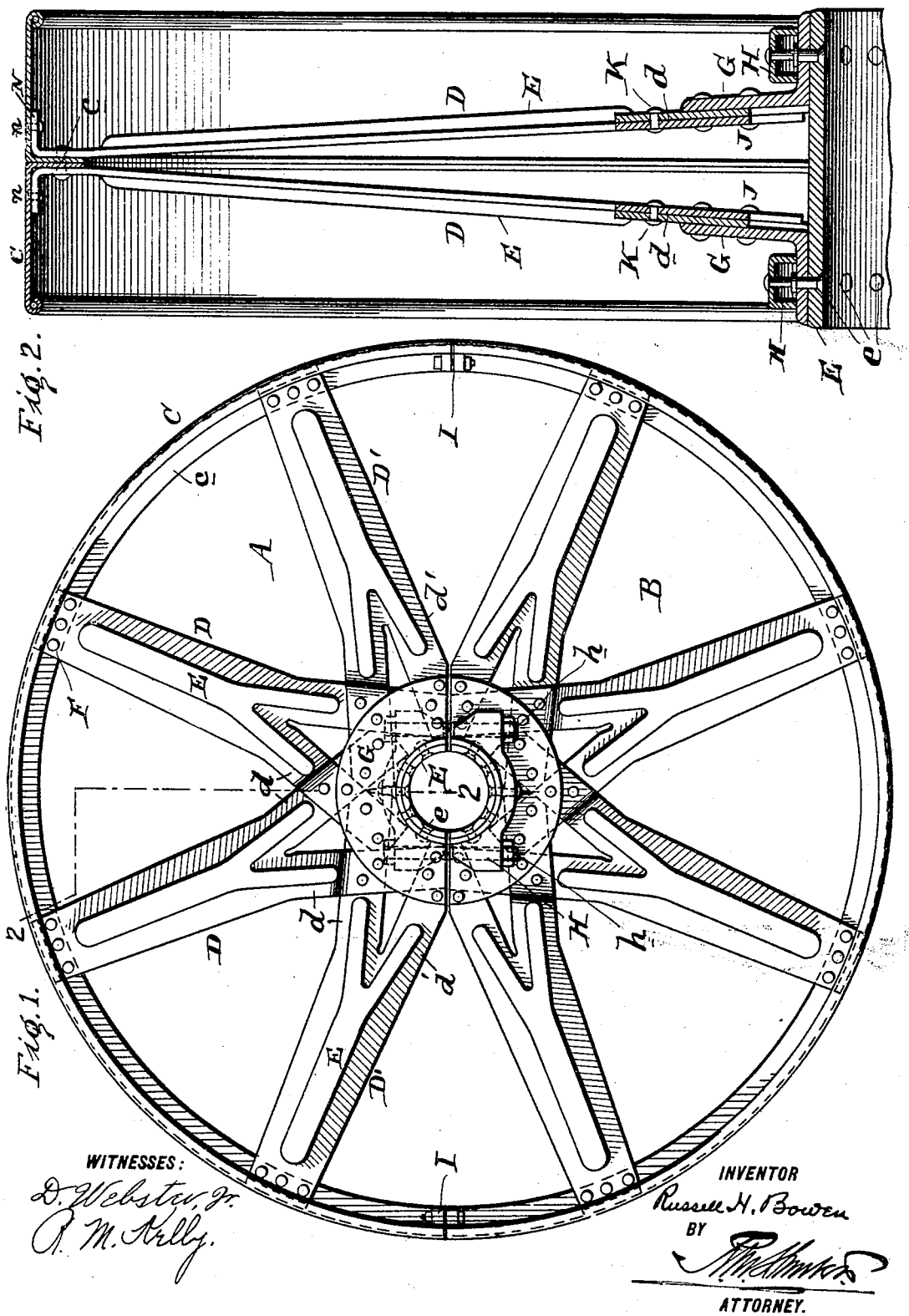

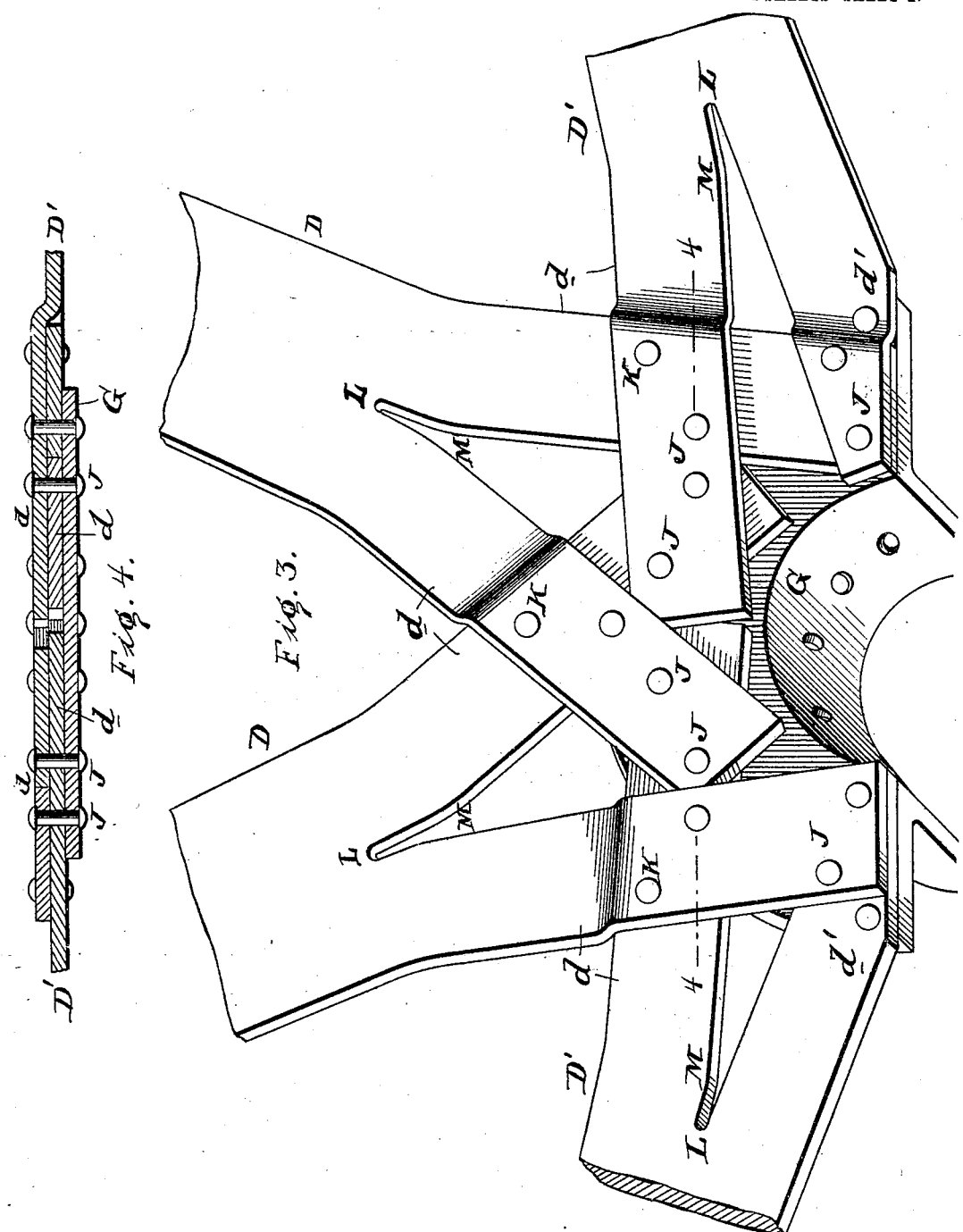

UNITED STATES PATENT OFFICE.

RUSSELL H. BOWEN, OF PALMYRA, NEW JERSEY, ASSIGNOR TO THE AMERICAN PULLEY COMPANY, A CORPORATION OF PENNSYLVANIA.

SHEET-METAL PULLEY.

SPECIFICATION forming part of Letters Patent No. 774,347, dated November 8, 1904.

Application filed May 3, 1904. Serial No. 206,144. (No model.)

*To all whom it may concern:*

Be it known that I, RUSSELL H. BOWEN, of Palmyra, county of Burlington, State of New Jersey, have invented an Improvement in Sheet-Metal Pulleys, of which the following is a specification.

My invention has reference to sheet-metal pulleys; and it consists of certain improvements, which are fully set forth in the following specification and shown in the accompanying drawings, which form a part thereof.

The object of my invention is to provide a construction of sheet-metal pulley in which great strength will be secured between the spokes and hub, whereby the pulley shall be adapted for heavy duty without danger of rupturing the union between the spokes and hub structure.

In embodying my invention in practical form I connect the rim of the wheel with the flanges of a hub by a series of stamped sheet-steel spokes, each having single arms where they connect with the rim and double arms for connection with the hub and in which the several arms at and adjacent to the flanges of the hub overlap each other, but in such manner that they constitute only two layers of metal, and in the position so assumed said arms are riveted together and to the flanges of the hub.

My invention also comprehends details of construction, which, together with the features specified above, will be better understood by reference to the drawings, in which—

Figure 1 is a side elevation of a sheet-metal pulley embodying my invention. Fig. 2 is a sectional view of a portion of same on line 2 2 of Fig. 1. Fig. 3 is a perspective view showing the manner in which the spokes are connected to each other and to the flanges of the hub, and Fig. 4 is a cross-section on line 4 4 of Fig. 3.

The pulley as shown is a split pulley, being formed of the two halves A and B, united at the hub by hub-clamps H and bolts $h$ and split at the rim, as at I; but so far as my invention, broadly considered, is concerned the pulley may be made "solid" in place of being split.

C is the rim of the pulley and is formed of two semicircular flanged sheets riveted together and the outer edges beaded, or it may be formed in any other manner. As shown, it is provided with the internal flange $c$, centrally disposed and to which the spokes D D′ are riveted at F. These spokes are also, preferably, flanged at N and riveted to the circular body of the rim at $n$ to give additional strength. The spokes D and D′ are substantially Y-shaped, the single arm being secured to the rim and the double arms secured to the flanged portions G of the hub-piece E. The flanges G are formed of angle-iron curved into semicircular form and riveted at $e$ to the semicircular hub-piece E. As shown, there are two flanges G secured to the hub-piece E at a slight distance apart, so as to cause the two sets of spokes to stand obliquely to each other, and thereby greatly brace the structure of the wheel, as indicated in Fig. 2. The arms $d$ overlap each other, as clearly indicated in Fig. 3, forming at any place not more than two thicknesses, and these are riveted together at K and together and to the flange G at J. In the split-pulley construction there are four of such spokes D D′ in the half-pulley on each side, and of these the spokes D D each have one of their arms $d$ next to the flange G and the other arm $d$ overlapping two of the arms of two other spokes. In the case of the spokes D′ D′ one of them has both arms $d d'$ placed next to the flange G and the other has both of the arms $d d'$ overlapping corresponding arms of two of the spokes D D. In the case of the arms which overlap other arms I prefer to give them a slight bend to bring the remaining portion of the said arms into the same plane with the rest of the spoke. This will be readily understood by reference to Figs. 3 and 4. In constructing the spokes I prefer to stamp them of iron sheet metal, with bifurcations to the point L, and then subsequently bend the arms $d$ outward or away from each other at M a short distance from each terminal L of the bifurcations, so as not to weaken the spokes by tending to make them split. When the pulley is made as a split pulley, the spokes D' of the two halves will meet on the line of division, and then the arms d' of one half cannot overlap the arms of the other half. Consequently said arms d' are not bent at M, as are the arms d. In practice I prefer to make the spokes with ribs E extending along the main portion and also along the arms d d' for a portion of their length, as shown, to impart strength.

It is evident that my invention is equally applicable to wheels and sheaves, as the particular form or shape of the rim is not essential.

While I prefer the construction shown as an excellent embodiment of my invention, I do not confine myself to the minor details, as these may be modified without departing from the spirit of the invention.

Having now described my invention, what I claim as new, and desire to secure by Letters Patent, is—

1. In a wheel or pulley, the combination of a hub having a flange, rim, spokes connecting the hub-flange with the rim each spoke having bifurcated inner ends forming two spreading arms and in which said arms of one spoke overlap the arms of two of the other of the spokes, and rivets uniting said arms to the hub-flange.

2. In a wheel or pulley, the combination of a semicircular hub having a flange, a semicircular rim, spokes connecting the hub-flange with the rim each spoke having bifurcated inner ends forming two spreading arms and in which said arms of one spoke overlap the arms of two of the other of the spokes so as to form two layers of sheet metal, and rivets uniting said arms to the hub-flange.

3. In a wheel or pulley, the combination of a semicircular hub having a flange, a semicircular rim, spokes connecting the hub-flange with the rim each spoke having bifurcated inner ends near the hub forming two spreading arms and in which said arms of one spoke overlap the arms of two of the other of the spokes so as to form two layers of sheet metal and in which a portion of said arms are also bent where they overlap to bring all the arms beyond their points of contact into the same plane, and rivets uniting said arms to the hub-flange.

4. In a wheel or pulley, the combination of a hub having a flange, rim, spokes connecting the hub-flange with the rim each having bifurcated inner ends near the hub forming two spreading arms and in which said arms of one spoke overlap the arms of two of the other of the spokes and said spokes are further provided with ribs extending along the main portion and the two arms of the bifurcated portion, and rivets uniting said arms to the hub-flange beyond the ribbed portions of said arms.

5. In a wheel or pulley the halves adapted to be clamped together and each half consisting of a semicircular rim portion having an internal flange, a semicircular hub E having two flange portions G at a distance apart, and two sets of spokes D D connected at their outer ends to the flange of the rim and having their inner ends near the hub bifurcated and the arms d d' so formed overlapping each other, so that each of said arms overlaps two other arms, and rivets J uniting said arms to the flange portions of the hub.

6. In a wheel or pulley the halves adapted to be clamped together and each half consisting of a semicircular rim portion having an internal flange, a semicircular hub E having two flange portions G at a distance apart, and two sets of spokes D D connected at their outer ends to the flange of the rim and having their inner ends near the hub bifurcated and the arms d d' so formed overlapping each other, so that each of said arms overlaps two other arms, rivets J uniting said arms to the flange portions of the hub, and additional rivets K uniting the arms d d' where they overlap beyond the flange portions.

7. In a wheel or pulley, a semicircular hub E, combined with a semicircular flanged portion G riveted to the hub, a rim portion, and spokes secured to the rim and having their inner ends bifurcated to form arms each of which overlaps two similar arms of other of the spokes, and rivets securing said overlapping arms to the flanged portion G.

8. A spoke-arm for a metal wheel or pulley consisting of the part D having one end bifurcated at L and the arms d so formed bent away from each other, the point of spreading beginning at a point M beyond the terminal of the bifurcation.

9. A spoke-arm for a metal wheel or pulley consisting of the part D having one end bifurcated at L and the arms d so formed bent away from each other, the point of spreading beginning at a point M beyond the terminal of the bifurcation, and also having ribs E formed along the main portion and also a portion of the length of each of the arms d d'.

10. A spoke-arm for a metal wheel or pulley consisting of the part D' having one end bifurcated at L and the arms d d' so formed relatively bent away from each other, the point of spreading beginning at a point M beyond the terminal of the bifurcation and in which the arm d' is straight in alinement with the spoke and the bend wholly on the arm d.

In testimony of which invention I hereunto set my hand.

RUSSELL H. BOWEN.

Witnesses:
 R. M. HUNTER,
 R. M. KELLY.